United States Patent
Russell et al.

(10) Patent No.: US 8,406,811 B2
(45) Date of Patent: Mar. 26, 2013

(54) ANTENNA AND RADIO FREQUENCY UNIT FOR A WIRELESS TRANSMIT/RECEIVE UNIT

(75) Inventors: Jeffrey T. Russell, Blue Bell, PA (US); Aliye Ozge Kaya, Franklin Park, NJ (US); Prabhakar R. Chitrapu, Blue Bell, PA (US); Paul L. Russell, Jr., Pennington, NJ (US)

(73) Assignee: Interdigital Technology Corporation, Wilmington, DE (US)

( * ) Notice: Subject to any disclaimer, the term of this patent is extended or adjusted under 35 U.S.C. 154(b) by 1201 days.

(21) Appl. No.: 11/844,631

(22) Filed: Aug. 24, 2007

(65) Prior Publication Data

US 2008/0076478 A1    Mar. 27, 2008

Related U.S. Application Data

(60) Provisional application No. 60/840,154, filed on Aug. 25, 2006.

(51) Int. Cl.
*H04M 1/00* (2006.01)

(52) U.S. Cl. ........... 455/562.1; 455/569.1; 455/575.2; 455/550.1

(58) Field of Classification Search ........... 455/569.1, 455/575.2, 562.1, 550.1
See application file for complete search history.

(56) References Cited

U.S. PATENT DOCUMENTS 5,913,163 A * 6/1999 Johansson ............ 455/426.1

OTHER PUBLICATIONS

3GPP, $3^{rd}$ Generation Partnership Project; Technical Specification Group GSM/EDGE Radio Access Network; Feasibility Study for Evolved GSM/EDGE Radio Access Network (GERAN) (Release 7), 3GPP TR 45.912 V0.5.0 (yyyy-mm).

IEEE, IEEE P802.11n/D1.02 Draft Amendment to Standard for Information Tehnology—Telecommunications and Information Exchange Between Systems—Local and Metropolitan Area Networks—Specific Requirements—Part 11: Wireless LAN Medium Access Control (MAC) and Physical Layer (PHY) Specifications: Amendment <Number>: Enhancements for Higher Throughput, (Jul. 2006).

IEEE, IEEE P802.11n/D1.05 Draft Amendment to Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Amendment <Number>: Enhancements for Higher Throughput, (Oct. 2006).

* cited by examiner

*Primary Examiner* — Nghi H Ly
(74) *Attorney, Agent, or Firm* — Volpe and Koenig, P.C.

(57) ABSTRACT

An antenna and radio frequency unit (ARFU) that is external to a wireless transmit/receive unit (WTRU) includes a radio frequency (RF) front end device and an antenna in communication with the RF front end device. The RF front end device is in communication with the WTRU.

22 Claims, 6 Drawing Sheets

ANTENNA AND RADIO FREQUENCY UNIT FOR A WIRELESS TRANSMIT/RECEIVE UNIT

CROSS REFERENCE TO RELATED APPLICATION

This application claims the benefit of U.S. Provisional Application No. 60/840,154, filed Aug. 25, 2006, which is incorporated herein by reference as if fully set forth.

FIELD OF INVENTION

The present invention is related to antennas for wireless transmit/receive units (WTRUs). More particularly, an external antenna and radio frequency unit (ARFU) for a WTRU is disclosed.

BACKGROUND

Multiple-input/multiple-output (MIMO) technology, that typically utilizes multiple antennas, is currently being investigated, developed and standardized in order to increase data rates as well as to improve the radio link quality. Examples of various MIMO techniques may be found in the Institute of Electrical and Electronics Engineers (IEEE) 802.11n draft standard and in the third generation partnership project (3GPP) long term evolution (LTE) standards body. The global system for mobile communication enhanced data rates for global evolution radio access network (GERAN) is also investigating the use of multi-antenna mobile stations (MS) for the purpose of reception diversity.

A challenge exists, however, in the development of MIMO systems due to the difficulty of implementing multiple antennas in a small sized WTRU, such as a cell phone, personal data assistant (PDA), or other wireless device. Due to the smaller size of many WTRUs, the size, spacing and number of antennas that can be implemented in them is limited. Additionally, implementing multiple antennas may also affect the aesthetics of the device.

It would therefore be beneficial to provide an external antenna and radio frequency unit for use with a WTRU that would overcome the limitations described above.

SUMMARY

An ARFU that is external to a wireless WTRU is disclosed. The ARFU includes a radio frequency (RF) front end device and an antenna in communication with the RF front end device. The RF front end device is in communication with the WTRU.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

An external ARFU for a WTRU, with the ARFU existing preferably as a separate unit from the WTRU may be utilized to facilitate the implementation of MIMO technology into a WTRU that may include a single antenna.

Figure 1:
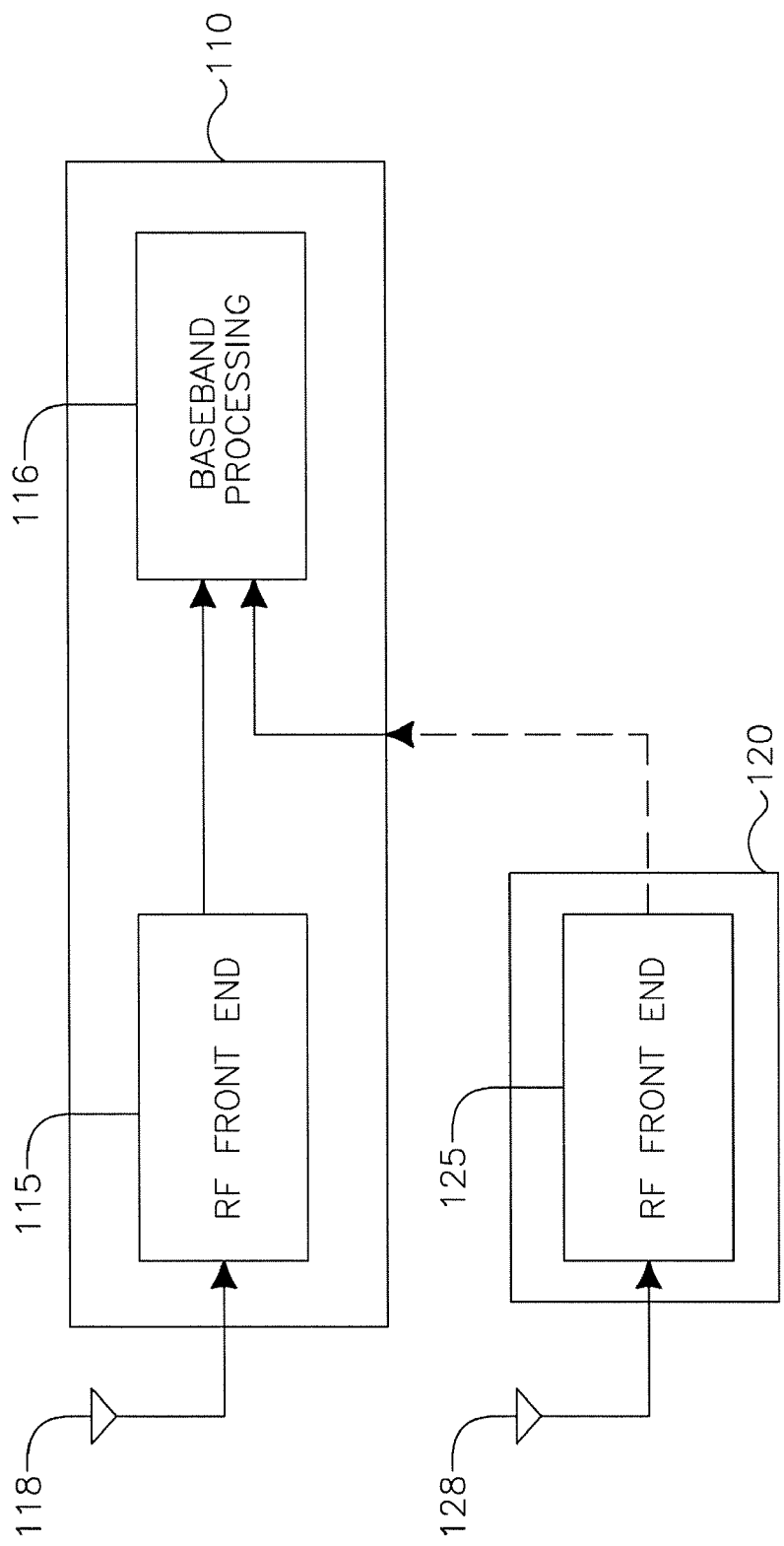
FIG. 1 is a functional block diagram of a receiver that includes a WTRU with an external ARFU device in accordance with an embodiment.

FIG. 1 is a functional block diagram of a receiver 100 that includes a WTRU 110 with an external ARFU device 120 in accordance with an embodiment. Among other components that may be included in a typical WTRU, the WTRU 110 includes an RF front end device 115, a baseband processing device 116, and an antenna 118. The antenna 118 is configured to transmit and receive a wireless signal and transfer a received signal to the RF front end device 115, which in turn transfers the signal to the baseband processing device 116. Although only one RF front end 115 and antenna 118 are shown in the WTRU 110, it may also include a plurality of RF front ends and associated antennas (not shown).

The external ARFU device 120 includes an RF front end device 125 and an antenna 128. The antenna 128 is configured to receive a wireless signal and transfer it to the RF front end device 125. The RF front end device 125 is in communication with the baseband processing device 116 of the WTRU 110 as indicated by the dashed arrow. Preferably, the connection between the RF front end device 125 and the baseband processing device 116 is via wireless communication, such as through an ultra-wideband (UWB) connection, and the like. However, a wired connection between the two devices, such as a universal serial bus (USB) connection and the like, may also exist. The external ARFU device 120 may exist as a separate physical unit capable of direct attachment to the WTRU 110, or may be a unit that can be carried separate from the WTRU 110, such as in a pocket or on a belt of a user of the WTRU 110. For example, the external ARFU device 120 may be in the form of, or incorporated into, a personal device such as a watch, pen, eyeglasses, earrings, and the like. Additionally, although only one external ARFU 120 is shown in FIG. 1, additional external ARFUs may utilized in communication with the WTRU 110.

The RF front end device 125 is capable of receiving a signal, such as a diversity signal, and demodulating the signal to a baseband signal. In a preferred embodiment, the RF front end device 125 receives a signal from the antenna 128, and transmits the baseband signal to the baseband processing unit 116 of the WTRU 110, which preferably performs demodulation, equalization, and decoding of the baseband signal, as well as diversity combining and/or other MIMO-related processing. The transmitted signal from the RF front end device 125 is preferably a digitized baseband signal, and preferably soft valued and oversampled. Also, some amount of baseband processing, such as baseband filtering or equalization, could be performed at the external ARFU 120 prior to transmitting the signal to the WTRU 110. In this respect, the RF front end device 125 may include a bandlimiting filter and gain control unit (not shown). Additionally, this performed filtering and equalization may have the effect that less data will be transmitted to the WTRU 110 from the external ARFU 120.

Figure 2:
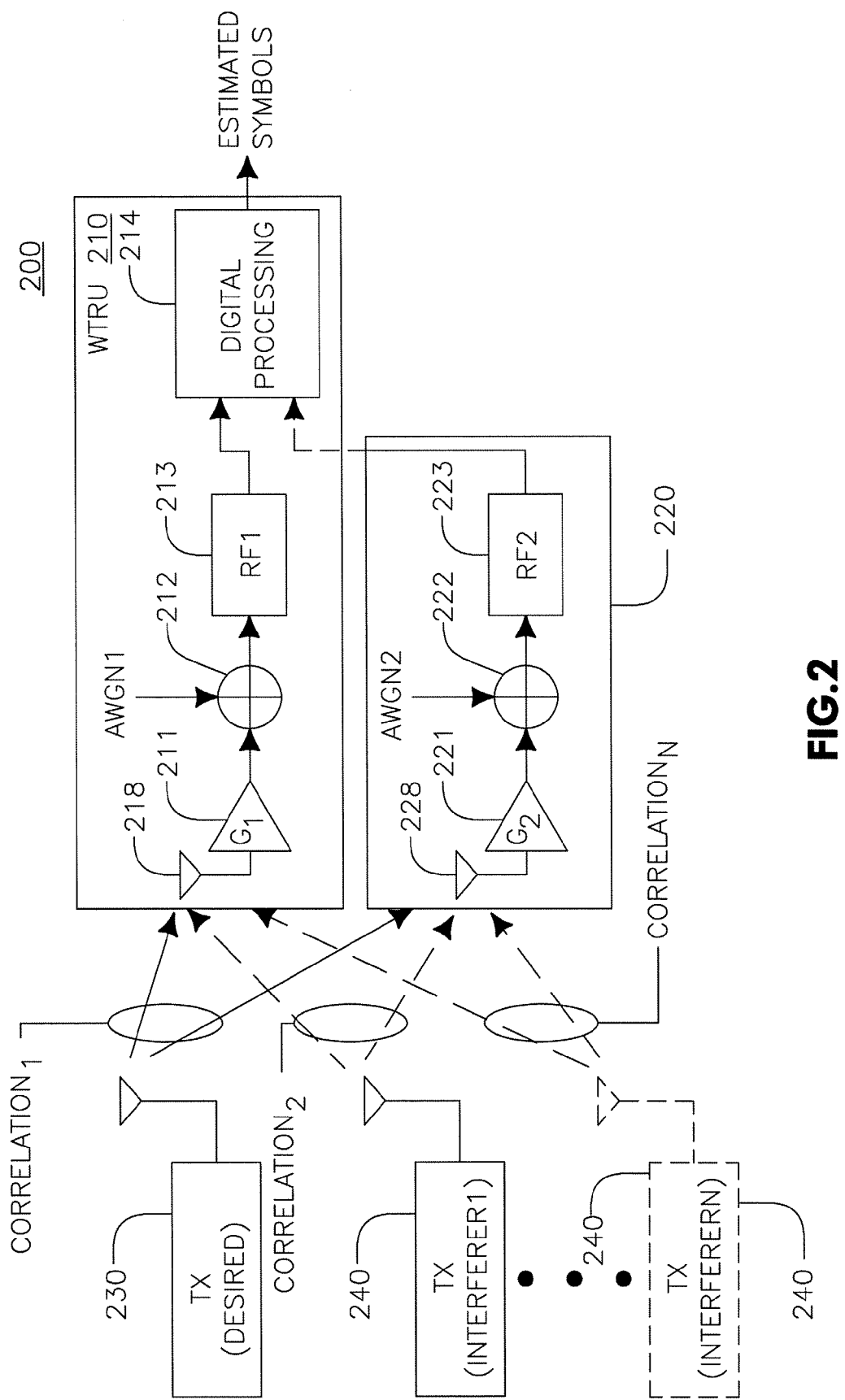
FIG. 2 is a functional block diagram of a receiver that includes a WTRU with a diversity booster in accordance with an additional embodiment.

If signal quality is low, or to perform high rate applications such as video telephony, file downloading, and the like, a diversity booster may be utilized. In this manner, the mobile station receiver diversity (MSRD) of the GERAN evolution may be benefited from. Accordingly, FIG. 2 is a functional block diagram of a receiver 200 that includes a WTRU 210 with a diversity booster 220 in accordance with an additional embodiment of the present invention.

Among other components that may be typical to a WTRU, the WTRU 210 includes an amplifier 211 (designated "$G_1$"), a mixer 212, an RF unit 213 (designated "RF1"), a digital processing device 214, and an antenna 218. The diversity booster 220 includes an amplifier 221 (designated "$G_2$"), a mixer 222, and an RF unit 223 (designated "RF2"), and an antenna 228. The RF unites 213 and 223 are substantially and functionally similar to the RF front end units 115 and 125, and the digital processing device 214 is substantially and functionally similar to the baseband processing unit 116 described in FIG. 1.

The antenna 218 of WTRU 210 receives a signal (designated by a solid arrow) from a desired transmitter (TX) 230 and signals (designated by dashed arrows) from interferer TXs 240 (designated TX (interferer1) . . . TX (interfererN)). The signals are forwarded to the amplifier 211, which forwards the signals to the mixer 212. The mixer 212 mixes the received signals with an additive white Gaussian noise signal (AWGN1) and forwards the signal to the RF unit 213, which in turn transfers it to the digital processing device 214.

The antenna 228 of the diversity booster receives the signal from TX 230 and the signals from TXs 240 and forwards them to the amplifier 221, which in turn forwards them to the mixer 222. The mixer 222 mixes the received signals with an AWGN2 and forwards the signal to RF unit 220, which transfers it to the digital processing device 214. Preferably, the connection between the RF unit 223 and the digital processing device 214 is via wireless communication, such as through an ultra-wideband (UWB) connection, and the like. However, a wired connection between the two devices, such as a universal serial bus (USB) connection and the like, may also exist.

The digital processing device 214 performs a correlation between the signals received from both the RF1 unit 213 and the RF2 unit 223, and generates estimated symbols. As shown in FIG. 2, there is a correlation between the signal received by antenna 218 and 228 from TX 230 (Correlation1), and the signals received from the interfering TXs 240 (Correlation2 . . . CorrelationN). In general, the correlation between antennas is dependent on the distance between the antennas, with a distance of 0.5 wavelengths being necessary for having a decorrelated signal at the receiver 200.

For example, a distance of 4 cm corresponds nearly to 0.1 wavelengths at 800/900 MHz, or 0.25 wavelengths at 1800/1900 MHz. By having a physically separate diversity booster 220, the antennas (218 and 228) are farther apart, thereby having less correlation, which tends to produce greater diversity gain than if the antennas were co-located within, for example, a cellular phone. In this manner, it may facilitate isolation and combining of the diversity signals as the independent components are more resolvable. Performance may be increased even further by utilizing additional antennas (not shown) in the diversity booster 220 and sophisticated beamforming algorithms. Additionally, the receiver 200 may also increase the data rate, by having a base station transmit different data streams on different antennas.

Figure 3:
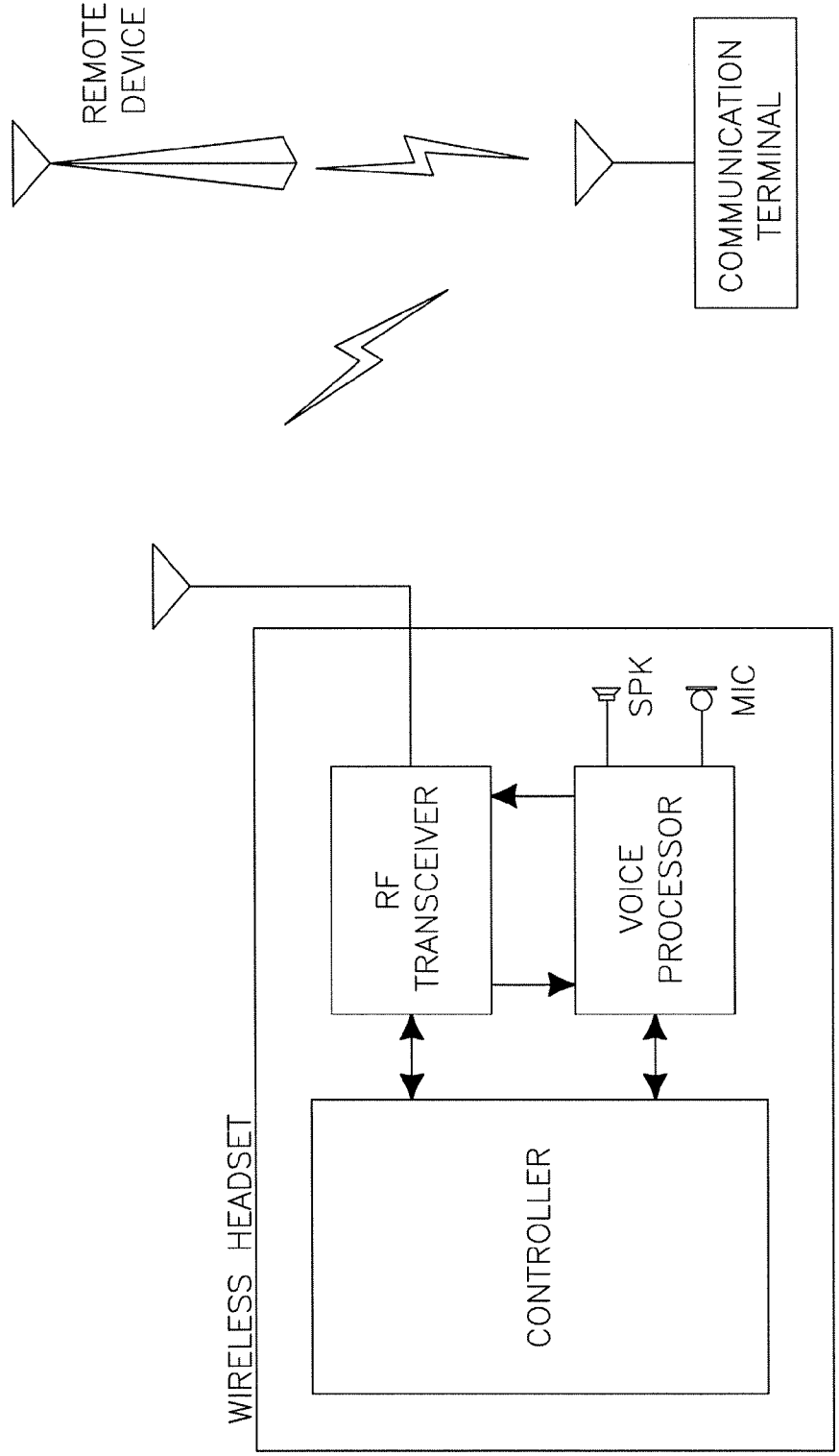
FIG. 3 shows a prior art wireless communication system including a wireless headset.

In one embodiment, the ARFU may be employed in a wireless headset in communication with a WTRU as well as with a remote device. In the prior art, headsets are only in wireless communication with one entity, the communication terminal. FIG. 3 shows such a prior art wireless communication system 300, where a wireless headset is in communication solely with the communication terminal, which is in communication with a remote device.

Figure 4:
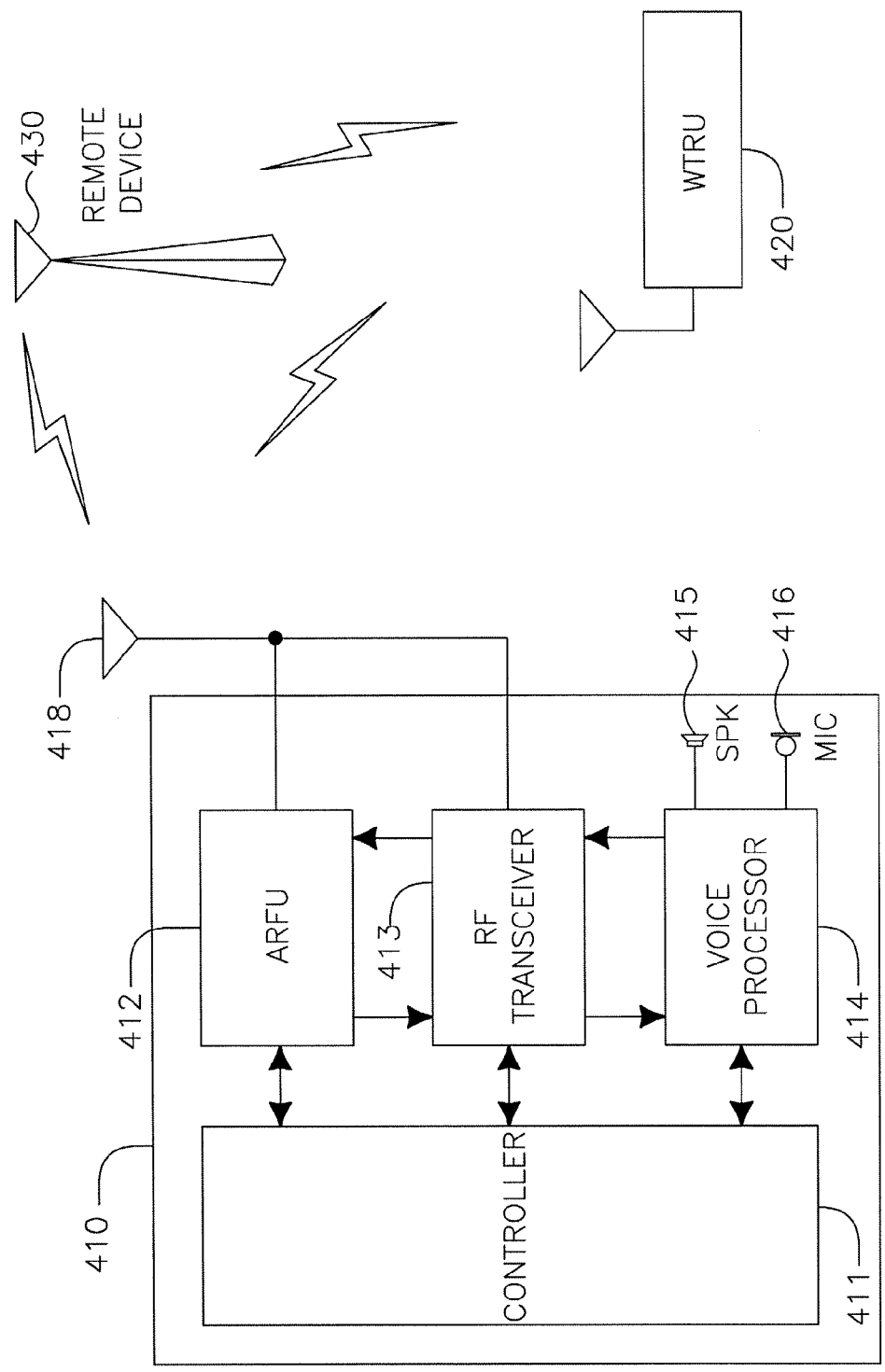
FIG. 4 shows a wireless communication system including a wireless headset configured in accordance with an additional embodiment.

FIG. 4 shows a wireless communication system 400 including a wireless headset 410 configured in accordance with an additional embodiment. Preferably, the wireless headset 410 includes a controller 411, an ARFU 412, an RF transceiver 413, a voice processor 414, a speaker (SPK) 415 and a microphone (MIC) 416. Additionally, an antenna 418 is in communication with the ARFU 412 and the RF transceiver 413 to facilitate the wireless transmission and reception of data. It should also be noted that the controller 411 may be optional and not necessarily included in the wireless headset 410.

In general, the RF transceiver 413 establishes and/or maintains the primary wireless link between the WTRU 420 and the ARFU 312. It is also utilized for bidirectional voice communications with the WTRU 420 and may also, in an embodiment, be used to transmit receive diversity data to the WTRU 420, and receive transmit diversity data from the WTRU 420.

The voice processor 414 receives and processes voice signals from the headset MIC 416 and forwards the processed signal to the RF transceiver 413 for transmission to the WTRU 420. Alternatively, the voice processor 413 may forward the processed signal to the controller 411. The voice processor 413 also receives voice signals from the controller 411 and/or the RF transceiver 413, processes the voice signal, and forwards the processed signal to the SPK 415.

The controller 411 may be utilized to coordinate the respective operations of the ARFU 412, voice processor 414 and RF transceiver 413. The controller 411 may act as a conduit for voice and/or diversity data between the ARFU 12, voice processor 414 and RF transceiver 413.

Alternatively, the controller 411 may provide control signals for the ARFU 12, voice processor 414 and RF transceiver 413. For example, the controller 411 may receive diversity data from the ARFU 412 and forward the data to the RF transceiver 413 for transmission to the WTRU 420. In another example, the controller 411 may receive voice signals from the voice processor 414 and forward the data to the RF transceiver 413 and/or the ARFU 412. Alternatively, the controller 411 may signal the RF transceiver 413 to forward data to the ARFU 412.

In an embodiment that does not include a controller 411, the ARFU 412, RF transceiver 413, and voice processor 414 may interact by communicating with one another directly.

The wireless headset 410 is in wireless communication with a WTRU 420 and a remote communication device (remote device) 430 via the antenna 418. In particular, a first communication link exists between the antenna 418 and the WTRU 420, and a second communication link exists between the antenna 418 and the remote communication device 430. The first communication link may be utilized for transmission and/or reception of voice communication and diversity data between the wireless headset 410 and the WTRU 420. The second communication link provides transmission and/or reception diversity for the WTRU 420, which may also be directly in communication with the remote device 430, which may be, for example, a base station or other terminal device. Although in a preferred embodiment, the communication links are wireless, wired communication links may also be utilized.

The ARFU 412 operates substantially similarly to the ARFUs and diversity boosters described in FIGS. 1 and 2, respectively, in order to provide reception diversity to the WTRU 420. Preferably, the ARFU 412 receives a wireless transmission from the remote communication device 430, performs RF processing on the signal and transmits the processed diversity signal to the WTRU 420. Additionally, the ARFU 412 may perform baseband processing on the signal.

In order to provide transmit diversity, the ARFU 412 receives transmit diversity data in a signal from the WTRU 420, performs RF processing on the signal, and transmits the processed diversity signal to the remote communication device 430. Additionally, the ARFU 412 may perform baseband processing on the signal.

The diversity data may be in the form of voice or data, and may be any combination of physical layer, data link layer, network layer, transport layer, or application layer data. The diversity data transmissions between the headset 410 and WTRU 420 may be time multiplexed on the first communication link or may operate on a dedicated channel. In addition, the antenna 418 may also act as the primary antenna for the WTRU 420.

Figure 5:
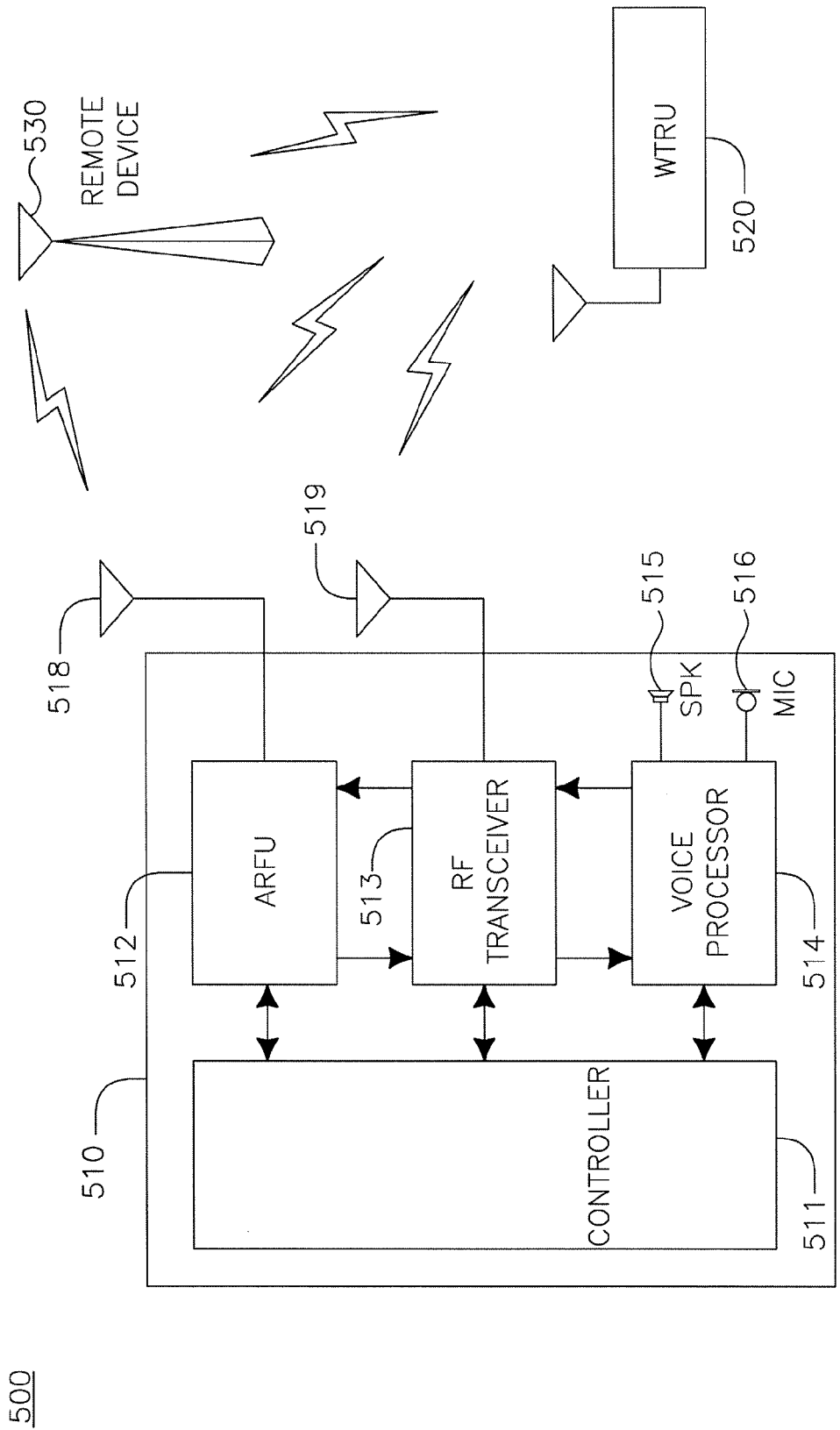
FIG. 5 shows a wireless communication system including a wireless headset configured in accordance with an additional embodiment.

FIG. 5 shows a wireless communication system 500 including a wireless headset 510 configured in accordance with an additional embodiment of the present invention. The wireless headset 510 includes a controller 511, an ARFU 512 in communication with the controller 511, an RF transceiver 513 in communication with the controller 511, a voice processor 514 in communication with the controller 511 and the RF transceiver 513, a SPK 515 in communication with the voice processor 514 and a MIC 516 in communication with the voice processor 514. Additionally, an antenna 518 is in communication with the ARFU 512 to facilitate the wireless transmission and reception of data from the ARFU 512 and an antenna 519 is in communication with the RF transceiver 513 to facilitate the wireless transmission and reception of data from the RF transceiver 513. The controller 511, ARFU 512, RF transceiver 513 and voice processor 514 of FIG. 5 are substantially and functionally similar to the controller 411, ARFU 412, RF transceiver 413 and voice processor 414 of FIG. 4. Additionally, as in the headset 410 of FIG. 4, the controller 511 of the headset 510 may be an optional component.

In this embodiment, a first communication link exists between the antenna 518 and the WTRU 520, and a second communication link exists between the antenna 519 and the WTRU 520. An additional communication link exists between the antenna 518 and a remote communication device (remote device) 530, and the WTRU 520 is in wireless communication directly with the remote communication device 530. In this manner, the ARFU 512 provides diversity data to the WTRU 520 and the remote communication device 530 through the antenna 518 in a similar fashion to the ARFU 412 of the wireless headset 410, while the RF transceiver 513 provides voice communication with the WTRU 520 via the antenna 519.

Figure 6:
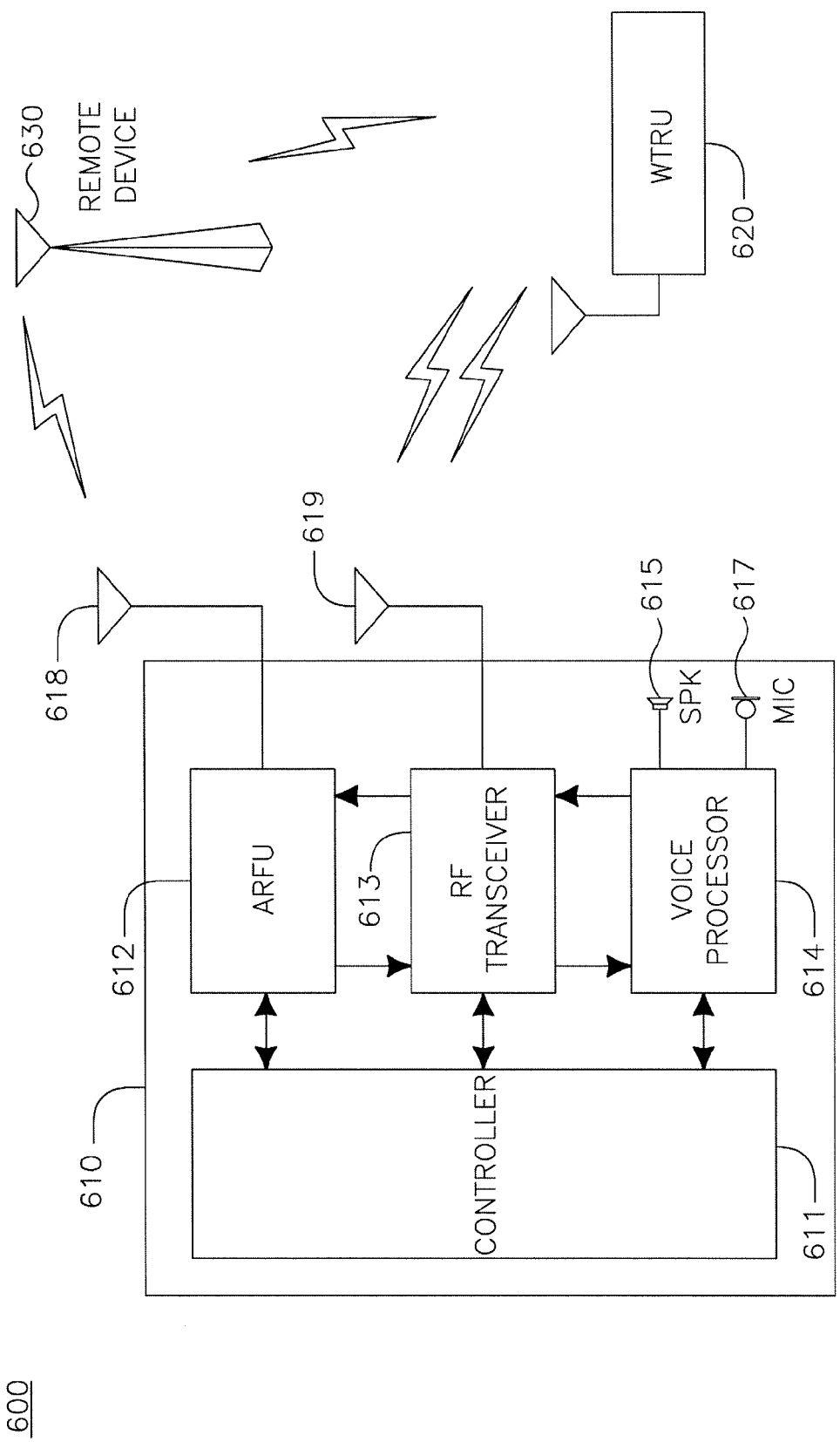
FIG. 6 shows a wireless communication system including a wireless headset configured in accordance with an additional embodiment.

FIG. 6 shows a wireless communication system 600 including a wireless headset 610 configured in accordance with an additional embodiment of the present invention. The wireless headset 610 includes a controller 611, an ARFU 612 in communication with the controller 611, an RF transceiver 613 in communication with the controller 611, a voice processor 614 in communication with the controller 611 and the RF transceiver 613, a SPK 615 in communication with the voice processor 614 and a MIC 616 in communication with the voice processor 614. Additionally, an antenna 618 is in communication with the ARFU 612 to facilitate the wireless transmission and reception of data from the ARFU 612 and an antenna 619 is in communication with the RF transceiver 613 to facilitate the wireless transmission and reception of data from the RF transceiver 613. The controller 611, ARFU 612, RF transceiver 613 and voice processor 614 of FIG. 6 are substantially and functionally similar to the controller 411, ARFU 412, RF transceiver 413 and voice processor 414 of FIG. 4. Additionally, as in the headset 410 of FIG. 4, the controller 611 of the headset 610 may be an optional component.

In this embodiment, a first communication link exists between the antenna 618 and the remote communication device 630, and a second communication link exists between the antenna 619 and the WTRU 620. The WTRU 620 is also in wireless communication directly with a remote communication device (remote device) 630. In this manner, the ARFU 612 provides diversity data to the remote communication device 630 through the antenna 618 in a similar fashion to the ARFU 612 of the wireless headset 610, while the RF transceiver 613 provides voice communication and diversity data with the WTRU 620 via the antenna 619.

The wireless headsets 410, 510, and 610 may be in-ear, over the ear, stereo, monaural and the like.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. An antenna and radio frequency unit (ARFU), the ARFU comprising:
   a radio frequency (RF) front end device for receiving a diversity signal from a remote communication device and demodulating the diversity signal to a baseband signal; and
   an antenna in communication with the RF front end device;
   wherein the RF front end device is in direct communication with a baseband processing unit of a wireless transmit/receive unit (WTRU) and transmits the baseband signal to the baseband processing unit to enable the WTRU perform multiple-input multiple-output (MIMO)-related processing based on the diversity signal;
   wherein the ARFU is a separate and external device to the WTRU: and
   wherein the ARFU and the WTRU receive separate signals from the remote communication device.

2. The ARFU of claim 1, wherein the RF front end device is in wireless communication with the WTRU.

3. The ARFU of claim 1, wherein the RF front end device is in wired communication with the WTRU.

4. The ARFU of claim 1 wherein the RF front end device produces a digitized baseband signal.

5. The ARFU of claim 4, further comprising the RF front end device performing baseband filtering on the digitized baseband signal.

6. The ARFU of claim 4, further comprising the RF front end device performing equalization on the digitized baseband signal.

7. The ARFU of claim 1 wherein the WTRU includes an RF front end, a base band processing unit, and an antenna in communication with the RF front end.

8. The ARFU of claim 1, further comprising an amplifier and a mixer, wherein the amplifier is in communication with the antenna and the mixer, and the mixer is in communication with the RF front end unit.

9. The ARFU of claim 8 wherein the WTRU further comprises an amplifier, an RF front end unit, a digital processing device and a mixer, wherein the amplifier is in communication with the antenna and the mixer, the mixer is in communication with the RF front end unit, and the RF front end unit is in communication with the digital processing device.

10. The ARFU of claim 9 wherein the mixer of the WTRU introduces a first additive white Gaussian noise (AWGN) signal to the signal received from the amplifier of the WTRU.

11. The ARFU of claim 10 wherein the mixer of the ARFU introduces a second AWGN signal to the signal received from the amplifier.

12. The ARFU of claim 9 wherein the antenna of the WTRU and the antenna of the ARFU are separated by a distance.

13. The ARFU of claim 12 wherein the distance is 20 centimeters (cm).

14. The ARFU of claim 12 wherein the distance is 8 centimeters (cm).

15. A wireless headset external to a wireless transmit/receive unit (WTRU), the wireless headset comprising:
    an antenna and radio frequency unit (ARFU) comprising
       a radio frequency (RF) front end device; and
       an antenna in communication with the RF front end device;
       wherein the RF front end device is in direct communication with a baseband processing unit of the WTRU;
       wherein the ARFU is a separate and external device to the WTRU;
    an RF transceiver;
    a voice processor in communication with the RF transceiver;
    a controller in communication with the ARFU, RF transceiver and the voice processor; and
    a first antenna in communication with the ARFU;
    wherein the wireless headset is configured to transmit diversity data from a remote communication device to the WTRU to enable the WTRU perform multiple-input multiple-output (MIMO)-related processing based on the diversity signal.

16. The wireless headset of claim 15 wherein the wireless headset is configured to transmit diversity data from the WTRU to a remote communication device.

17. The wireless headset of claim 15 wherein the ARFU is configured to perform baseband processing on a received signal.

18. The wireless headset of claim 15 wherein the first antenna is in communication with the RF transceiver, and wherein a first communication link is established between the first antenna and the WTRU and a second communication link is established between the first antenna and the remote communication device.

19. The wireless headset of claim 15, further comprising a second antenna in communication with the RF transceiver, and wherein a first communication link is established between the first antenna and the WTRU, a second communication link is established between the first antenna and the remote communication device, and a third communication link is established between the second antenna and the WTRU.

20. The wireless headset of claim 15, further comprising a second antenna in communication with the RF transceiver, and wherein a first communication link is established between the second antenna and the WTRU, and a second communication link is established between the first antenna and the remote communication device.

21. The wireless headset of claim 15, further comprising a speaker and a microphone, wherein the speaker and the microphone are in communication with the voice processor.

22. The wireless headset of claim 15 wherein the RF transceiver of the headset communicates wirelessly with the WTRU via an ultra-wideband (UWB) connection.

* * * * *